No. 674,409. Patented May 21, 1901.
F. R. HIESTER.
STEERING DEVICE FOR HORSELESS VEHICLES.
(Application filed Feb. 27, 1901.)
(No Model.)
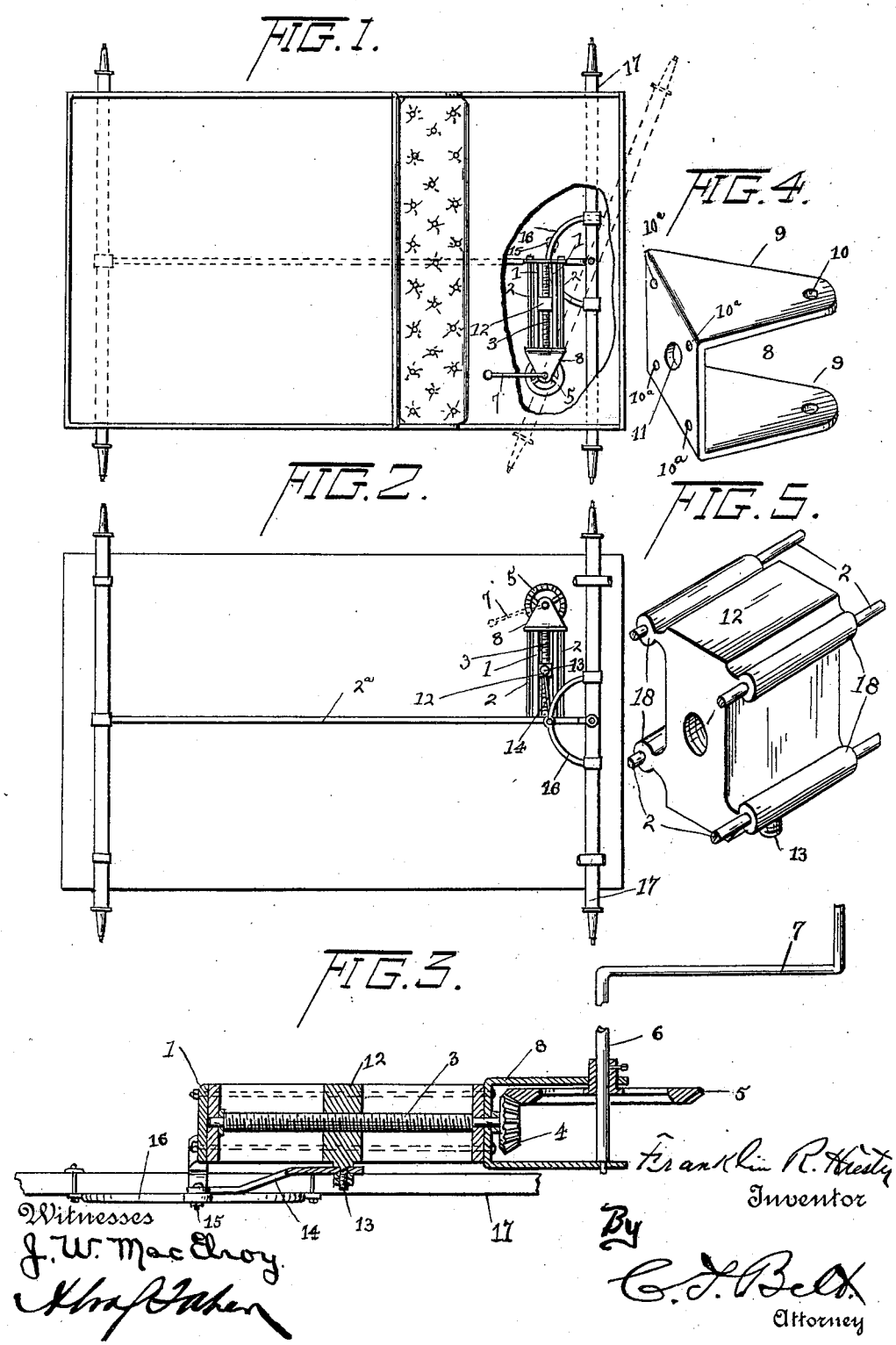

UNITED STATES PATENT OFFICE.

FRANKLIN R. HIESTER, OF CENTERPORT, PENNSYLVANIA.

STEERING DEVICE FOR HORSELESS VEHICLES.

SPECIFICATION forming part of Letters Patent No. 674,409, dated May 21, 1901.

Application filed February 27, 1901. Serial No. 49,085. (No model.)

*To all whom it may concern:*

Be it known that I, FRANKLIN R. HIESTER, a citizen of the United States, residing at Centerport, in the county of Berks and State of Pennsylvania, have invented certain new and useful Improvements in Steering Devices for Horseless Vehicles, of which the following is a specification.

This invention relates to horseless vehicles; and the object of the invention is to provide novel and peculiar means for steering automobiles and other horseless vehicles.

In the accompanying drawings, forming part of this application, Figure 1 is a top view of a vehicle-bed, partly broken away, showing the steering device applied, with the front axle in movable position. Fig. 2 is an inverted plan view. Fig. 3 is a central longitudinal section. Fig. 4 is a perspective view of the hanger or bracket. Fig. 5 is a modification of the screw nut and frame, partly broken away.

The same numeral references denote the same parts throughout the several views of the drawings.

The screw-frame 1 has brace-rods 2, by means of which and a bar 1ª the frame is secured to the vehicle coupling-pole 2ª. In the ends of the frame 1 the screw 3 has its ends journaled, and it extends through the rear end of the frame and is provided with a pinion 4, which meshes with a gear-wheel 5 on a vertical shaft 6, having a crank-handle 7. The shaft and gear are supported by a hanger or bracket 8, secured to the rear end of the frame 1 by the brace-rods 2. The hanger consists of parallel pointed wings 9, having apertures 10, in which the shaft 6 is journaled. An opening 11 is made in the hanger for the screw 3, and apertures 10ª are provided for the rods 2. The screw 3 is provided with a nut 12, having a pivot 13, to which is pivoted one end of a lever 14, the other end being pivoted at 15 to the hound 16 of the front axle 17.

It will be seen that the hand-lever extends in convenient reach of the motorman, and by turning said handle the screw is operated to turn the nut back and forth, which will turn the front axle as desired.

It is obvious that variations may be made in the application of the device to suit various forms of horseless vehicles.

Referring to the modification shown in Fig. 5, the side pieces of the screw-frame are dispensed with, and in lieu thereof ears 18 are formed on the nut and slide on the brace-rods.

Having thus described my invention, what I claim as new, and desire to secure by Letters Patent, is—

In a horseless-carriage steering device, the combination, with the screw, the frame holding the screw free to turn therein, a nut loose upon the screw and held against turning by the said frame, and a lever pivoted to the nut and to the vehicle-axle, of the shaft, pinion, gear, and gear hanger or bracket secured to the said frame and having wings in which the shaft is journaled, and an opening for the pinion end of said screw.

In witness whereof I hereunto set my hand in the presence of two witnesses.

FRANKLIN R. HIESTER.

Witnesses:
JOSEPH D. HAFTZINGER,
J. G. REBER.